United States Patent Office 3,143,410
Patented Aug. 4, 1964

3,143,410
PREVENTION OF COALESCENCE OF HYGRO-SCOPIC GRANULAR MATERIAL WITH COLLOIDAL CLAY
Homer A. Smith, Berkeley Heights, N.J., assignor to Minerals & Chemicals Philipp Corporation, a corporation of Maryland
No Drawing. Filed Oct. 21, 1959, Ser. No. 847,706
8 Claims. (Cl. 71—64)

The present invention relates to a novel improved method of preventing the normal tendency of hydroscopic granular material to coalesce due to heat, pressure and/or moisture in the surrounding atmosphere. The invention relates also to the novel cake-resistant granular compositions thus produced.

My invention is of wide application, having utility in the provision of improved granular compositions of diverse chemical nature. One of the fields in which my invention is particularly useful is in the manufacture of inorganic hygroscopic fertilizers, such as ammonium or sodium nitrate pills, and purely for purposes of explanation and illustration I shall explain my invention with particular reference to its employment in the manufacture of fertilizers.

Hygroscopic crystalline material, such as inorganic fertilizer salts, tend to coalesce in the presence of heat, pressure and/or moisture and set up into hard coherent cakes, sometimes appropriately called "tombstones." The phenomenon of caking of hygroscopic solids may be explained as follows. As a result of increase in temperature and/or humidity hygroscopic fertilizer solids absorb large quantities of water. A portion of the crystals dissolve in this water. With subsequent lowering of temperature and/or humidity, the dissolved material recrystallizes, and the recrystallized material forms a bridge between adjacent crystals and causes coalescence therebetween. Pressure, too, plays its part, since high pressure favors the coalescence of the recrystallized fertilizer material with other crystals. When hygroscopic fertilizer is stored over long periods of time this process repeats itself until the bag or pile of fertilizer becomes a solid coherent mass. Caked fertilizer represents an economic loss since it is difficult or impossible to distribute the fertilizer in such condition on crops.

The problem exists, for example, in the handling of mixed fertilizer which may be made by admixing ingredients such as, for example, potash, superphosphate, ammonium sulfate and a solution of ammonium nitrate and aqueous ammonia. The admixed ingredients are delivered from the reactor, either through a cooler or not, as desired, onto a stockpile where the fertilizer is cooled. The fertilizer is hygroscopic and tends to absorb moisture. As a result, the fertilizer in the pile becomes caked and has to be ground, after which it is bagged for shipment. Preferably, the mixed fertilizer is prepared as a granular material, usually consisting of particles within the range of from about 5 to 35 mesh. It has been found that granules, although prone to coalesce, are most resistant to coalescence than comminuted material of like composition since the number of points of contact between fertilizer particles is reduced materially. The bagged mixed fertilizer granules are still hygroscopic and become caked in the bags due to heat, pressure or moisture absorption, such caking seriously impairing the utility of the fertilizer. An analogous problem exists in the storage of other hygroscopic fertilizers exemplified by ammonium nitrate, urea, ammonium sulfate, ammonium phosphate, sodium nitrate, acidulated phosphate and potassium chloride.

Four general methods of obviating the caking of fertilizer and other hygroscopic materials have been suggested. One of the oldest methods involves the admixture of the active fertilizer ingredient with a powdered diluent which curtails the normal tendency of the active ingredient to coalesce. Thus, for example, ammonium nitrate has been diluted with calcium carbonate and the mixture formed into prills. Varying degrees of success have been attained with this technique, depending on the particular fertilizer, diluents and quantities of diluent employed. A principal disadvantage of this method is that relatively large quantities of diluent are employed and the concentration of active ingredient in the composition is reduced. Still another method depends on coating the normally hydrophilic fertilizer particles with a hydrophobic coating which acts as a moisture barrier. Numerous embodiments of this technique have been suggested in the prior art. One form of this method involves coating granules with finely divided clay which has been reacted with an organic compound to change the clay from its normal hydrophilic condition to a hydrophobic and organophilic material. The clay employed is one that has a high cation-exchange capacity. The organic compound is reacted with the clay by quantitative cation replacement and is a long chain amine. Another form of this method entails coating hygroscopic granules with a water-resistant coating, such as a rosin-petrolatum mixture, and embedding finely divided mineral matter such as diatomaceous earth or kaolin clay in the organic coating. These procedures add to the cost of the granular material. Furthermore, nitrate fertilizers are potentially explosive in the presence of oxidizable matter and the presence of organic matter with nitrates during storage is recognized to be a hazard.

One of the most inexpensive and widely used procedures for preventing caking of fertilizers involves dusting the surface of fertilizers granules with a powdered moisture absorptive material so as to form a continuous tenacious barrier around each of the fertilizer granules. In putting this method into practice, the granules are agitated in the presence of the absorptive powder, usually in a rolling drum, and the powder is permitted to accumulate on the granule surface until a firm compact continuous coating is formed. Diatomaceous earth has been one of the principal materials used for the purpose. Another mineral which has met increasing widespread commercial acceptance is activated Georgia-Florida fuller's earth (calcined attapulgite clay). In order to coat hygroscopic granules effectively, diatomaceous earth and activated Georgia-Florida fuller's earth are generally used in an amount of at least 1% (and more frequently from 2% to 5%) of the weight of active fertilizer ingredient. These conditioning agents are relatively expensive as compared with the fertilizer salt. The use of such quantities of inert diluent increases the overall cost of active composition and reduces the analysis of active fertilizer ingredient. A method of preventing caking has been suggested which involves the use of smaller quantitites of conditioning agent than the aforementioned methods. The fertilizer is coated with a small quantity of organic dye or synthetic detergent. Molecules of this sort act as nuclei for the formation of small crystallites, rather than the macrocrystals normally formed when solubilized material in the granule recrystallize. These small crystallites are structurally weak with the result that weak bridging between adjacent fertilizer granules exists rather than the strong bridging which would occur if larger crystals were present. Suitable organic materials are expensive and are not recommended in the conditioning of nitrates.

Accordingly, a principal object of my invention is the provision of a method of preventing the caking of granular material which tends to coalesce due to the effects of heat, pressure and/or moisture and which obviates the aformentioned disadvantage and difficulties.

A more particular object of my invention is the provision of a method of conditioning such granular material with a naturally occurring clay which entails the use of smaller quantities of clay than have proved useful in conditioning with other clays by prior art techniques.

A further object of the invention is the provision of novel cake-resistant granular compositions including very small but effective quantities of naturally occurring clay as the conditioning agent.

A more particular object of the invention is the provision of cake-resistant fertilizer granules of exceptionally high analysis.

An important object of the invention is the provision of cake-resistant nitrate granules which are free from deleterious oxidizable organic matter.

These and further objects and advantages will be readily apparent from the description of my invention which follows.

I have discovered a method by which minute quantities of certain colloidal clays, hereafter set forth, may be employed to prevent the normal tendency of hygroscopic granules, such as nitrate fertilizer prills, to coalesce due to the effects of heat, pressure and or moisture.

Stated briefly, the method of the subject invention involves uniformly coating the surface of individual hygroscopic granules with a dispersion of discrete colloidal particles of a clay which is stable in the presence of electrolyte solutions, e.g., colloidal attapulgite or colloidal sepiolite clay. The quantity of colloid clay I coat on the granules is very small and is insufficient to form a continuous tenacious barrier around individual granules, as is the case when diatomaceous silica, activated attapulgite clay, etc., are dusted on granules in accordance with the teachings of the prior art. Granules produced in accordance with my invention comprise a core of fertilizer material and, uniformly disseminated on the surface thereof, a discontinuous coating of discrete colloidal clay particles. The coating is discontinuous in the sense that insufficient clay is present to cover completely the entire exposed surface of the granules so that at least some portion of the granules surface is exposed to the atmosphere. The granules conditioned in this manner have an exceptionally high analysis of active ingredient. Whereas at least about 1% (based on the weight of the granules) of diatomaceous earth or activated attapulgite must be dusted on nitrate granules to condition them against caking, my invention affords a method of conditioning with only a fraction of such quantities of clay. Thus, granules conditioned in accordance with the method of the invention are free from substantial quantities of inert matter normally present in clay conditioned material.

Whereas the prior art method of conditioning with naturally occurring clay depends on accumulating a relatively thick layer of microscopic (i.e., noncolloidal) clay particles on the granule surface, conditioning in accordance with the method of my invention would seem to function by a very different mechanism. This is apparent from a consideration of the observation that the dissemination of minute quantities of the colloidal clay in a discontinuous film on the surface of normally coalescable granules effectively prevents caking. Although I do not wish to be bound by the following hypothesis, it seems to offer a reasonable explanation for the phenomenon. The presence of discrete, insoluble colloidally dimensioned clay crystals on the surface of the granules is thought to lower the surface tension between the granule and any solubilized matter on the granule surface resulting from absorption of moisture by the granules. When the solubilized matter recrystallizes due to changes in environmental factors, the colloidal clay particles influence the formation of minute crystallites rather than the normal structurally rigid macrocrystals which would bridge adjacent granules and result in caking.

The present invention is applicable to improving the storage properties of wide varieties of normally solid hygroscopic materials, both pure compounds and mixtures. As examples of granular materials which may be benefitted may be cited inorganic fertilizer salts such as, for example, sodium nitrate, ammonium nitrate, urea, ammonium sulfate, ammonium chloride, and mixtures of the aforementioned; also mixed fertilizers including those with potassium compounds; chemicals, such as sodium chloride, potassium chloride or other hygroscopic crystalline compounds, organic and inorganic. It is reasonable to expect that the method is applicable to the conditioning of resins which tend to coalesce such as, for example, phenolic resins. The aforementioned materials are in the form of macrocrystals or coherent aggregates, such as prills. The granules are usually in the form of particles within the range of about 5 to 35 mesh, although granules of larger and somewhat smaller size may be employed.

As mentioned, the colloidal clays I employ are those which are stable in the presence of solutions of electrolytes. Many colloidal clays, such as Wyoming bentonite, flocculate in the presence of electrolytes and are outside the scope of this invention. The preferred colloidal clay from the standpoint of availability is attapulgite clay, a hydrated magnesium aluminosilicate. Colloidal sepiolite and colloidal hectorite, which are also stable in the presence of electrolytes, may be used when available at reasonable cost. Mixtures of these clays may be used. By way of explanation, it should be noted that attapulgite and sepiolite are unique clay minerals. Unlike other clay minerals which are layered minerals, attapulgite and sepiolite are needle-like minerals. Attapulgite and sepiolite crystals are so thin that they can be seen only in an electron microscope. As found in nature these minerals occur in dense packets of needles. These packets can be dispersed in water to separate the material into the ultimate colloidally dimensioned mineral particles. This property is lost when these particular minerals are heated at elevated temperature, such treatment being generally termed "activation" which is usually carried out to improve the adsorptive capacity of the minerals. Since activated attapulgite or sepiolite can no longer be dispersed into colloidally dimensioned ultimate particles, they are no longer colloidal clays and are outside the scope of my invention.

In putting my invention into practice, the clay aggregates are initially broken up or dispersed to separate the aggregates into the ultimate colloidally dimensioned clay particles. To accomplish the requisite dispersion, the aggregates must be sheared in the presence of a polar liquid, preferably water. The resultant colloidal clay dispersion is sprayed uniformly on the granules to be conditioned. The colloidal dispersion may be screened to remove grit (plus 325 mesh particles), if desired.

I may use crushed (e.g., minus 4 mesh) raw clay which has been previously refined only to the extent that grit and coarse agglomerates are eliminated. The clay may be one that has been mildly dried, at temperatures and for times insufficient to reduce or eliminate the ability of the clay to be colloidally dispersed in water. Raw clay as mined usually has a free moisture content of about 35% and a total volatile matter content of about 45%. The term "free moisture" (F.M.) as used herein, refers to the weight percentage of clay eliminated by heating the clay essentially to constant weight at 220° F. The term "volatile matter" as used herein refers to the weight percentage of clay eliminated by heating the clay essentially to constant weight at 1800° F. The clay I employ has a volatile matter of at least about 10% since clays of lower volatile matter content are noncolloidal and will not produce the desired result.

An aqueous dispersion of colloidal clay is prepared by shearing colloidal clay in water, as by passing a mixture of clay and water through a 3-roll paint mill or colloid mill. The dispersion should be as concentrated as is consistent with the provision of a dispersion of sprayable consistency so as to restrict the quantity of water introduced into the granules. Dispersions of colloidal attapulgite which contain clay in amounts of about 5% by weight normally are viscous (although sprayable) and 10% dispersions of colloidal attapulgite clay are normally gels. To permit the inclusion of greater quantities of clay in the dispersion, I preferably form a dispersion which is deflocculated with a small quantity of any of the known deflocculating agents for clay, e.g., tetrasodium pyrophosphate or sodium silicate. The deflocculating agent reduces interparticle attraction between clay particles so that larger quantities of clay may be present in a dispersion of given viscosity than if the deflocculator is not used. I prefer to use aqueous dispersions of colloidal clay in which the weight concentration of clay is from about 10% to 17% of the total dispersion (calculated on a moisture free clay basis). In the preparation of such dispersions, a deflocculating agent is usually employed in an amount of from about 0.1% to 1%, based on the moisture free weight of the clay. Dispersions less concentrated than about 10% solids incorporate too much water in the granules and defeat to some extent the purpose of the coating operation, whereas deflocculated dispersions more concentrated than about 17% solids are difficult to spray.

The deflocculated dispersion is sprayed onto the granules in an amount sufficient to coat individual granules with colloidal clay in an amount from about 1 to about 15 pounds (calculated on a moisture free clay basis) per short ton of granules. Usually from 2 to 6 pounds of clay per ton of granules will suffice. For economic reasons as well as the desirability of producing a conditioned granule having the highest possible analysis, the minimum quantity of coating which will afford adequate conditioning is ordinarily used. The optimum quantity of colloidal clay will depend on the amount of surface of the granules that is exposed to the atmosphere and the composition of the granules. In this connection it will be noted that when diatomaceous earth or activated attapulgite powders are employed in conditioning, at least 20 pounds, and more usually 40 to 60 pounds or more, are recommended per ton of granules.

In carrying out the spraying, any technique for insuring uniform coating of the granules may be employed and any suitable spraying equipment may be employed. The granules are usually agitated during spraying; a convenient method is to inject a spray of the dispersion into a rotating drum containing the granules. The spraying is ordinarily carried out at room temperature. In many instances, the sprayed granules may be bagged or otherwise packaged without drying. Low temperature drying (e.g., 250 to 400° F.), below the melting point of constituents of the granules may be employed when relatively large quantities of coating have been used or when the solids content of the coating is low, in which cases undesirable quantities of water will have been introduced in the granules.

The term "naturally occurring" clay as used herein refers to clay in its normal hydrophilic condition and excludes clays which have been chemically reacted by esterification, base-exchange reaction with long chain onium compounds and the like.

Following are examples which are given only for the sake of illustrating certain embodiments of my invention and are not to be construed as limiting the scope thereof.

*Example I*

This example illustrates the conditioning of sodium nitrate prills in accordance with the present invention.

Attagel 30, a degritted colloidal attapulgite clay processed and supplied by Minerals & Chemicals Corporation of America, was used as the conditioning agent. The F.M. of Attagel 30 is about 15% to 22%.

A 17% solids aqueous dispersion of Attagel 30 was prepared by subjecting an appropriate quantity of the clay in water to high shear. The soilds content of the slurry is reported on the basis of the moisture free weight of the Attagel. Tetrasodium pyrophosphate had been dissolved in the water to which the Attagel was added in an amount of 0.50%, based on the weight of the Attagel, moisture free basis.

Five hundred parts by weight of approximately ¼-inch sodium nitrate spheres were placed in a rotatable metal drum. 1.47 parts by weight of the deflocculated dispersion of colloidal clay was sprayed by a nozzle into direct contact with the sodium nitrate prills as they were rolled in the drum. This dispersion contained 0.25 part by weight of Attagel, moisture free basis, and 0.001 part by weight of tetrasodium pyrophosphate. The mixture was rolled 2 to 5 minutes.

Two hundred gram fractions of the Attagel coated spheres were placed in sealed manila bags, and the packaged samples were tested for resistance to caking during storage. Uncoated prills were also similarly packaged and tested. The bags were each stored under a pressure of 5 p.s.i.g. in an outdoor unheated shed for nine months.

At the end of the nine-month test period, the Attagel treated samples were found to be free-flowing. The uncoated control samples were cement-like blocks. Thus, the use of Attagel in an amount corresponding to 1 pound (moisture free basis) per ton of sodium nitrate prevented caking of the prills.

*Example II*

The procedure of Example I was repeated, utilizing however, more of the dispersion of colloidal attapulgite clay to coat the sodium nitrate prills. Prills were coated with Attagel 30 in amounts of 1.5 to 6.0 pounds (on a moisture free Attagel basis) per ton of prills. All samples remained free-flowing after being aged for six months.

*Example III*

Experiments were conducted to determine whether various commercial activated attapulgite products would effectively condition the sodium nitrate prills against caking when used in the proportions found effective in conditioning by the method of the invention. In these experiments coating was conducted by rolling the prills in a dry powder of the attapulgite conditioning material, as taught by the prior art.

The attapulgite products were activated grades of clay (V.M. of 6% to 7%) which had been fluid energy milled to minus 20 microns and coarser than 1 micron (particle size measurements referring to values obtained by the Andreasen sedimentation method using 2.50 as the value of $\rho$).

Prills were placed in a cylindrical vessel, powdered attapulgite product added and the vessel rolled for 30 minutes. Samples were prepared using activated attapulgite in amounts of 1 to 6 pounds (moisture free basis) per ton of prills. The samples were tested as in Example I for storage stability. It was found that after storage for six months all samples were hard cakes, thus indicating that the prior art dry rolling conditioning method was ineffective when small quantities of activated clay were employed.

*Example IV*

Another example of my invention is as follows. A ton of ⅛-inch ammonium nitrate prills are sprayed with 26.7 pounds of a 15% solids aqueous dispersion of tetrasodium pyrophosphate deflocculated colloidal attapulgite clay containing 4 pounds of moisture free clay and 0.1 pound of tetrasodium pyrophosphate.

*Example V*

Following is still another example of my invention. A ton of 4 mesh urea granules are sprayed with 40.0 pounds of a 15% solids aqueous dispersion of tetrasodium pyrophosphate deflocculated colloidal Spanish speiolite clay containing 6 pounds of moisture free clay and 0.125 pound of tetrasodium pyrophosphate.

Example VI

A ton of sodium nitrate prills are placed in a rotating drum and sprayed with 10.0 pounds of a 10% solids aqueous dispersion of colloidal attapulgite clay containing 1.0 pound of clay and 0.075 pound "O" brand sodium silicate.

Example VII

Mixed fertilizer granules (20–0–20) are conditioned by spraying with a 12% solids (moisture free basis) deflocculated dispersion of Attagel 30 in water in amount of 5 pounds Attagel 30 (moisture free basis) per ton of granules. The granules are dried at 300° F. in a forced draft rotary drier.

I claim:

1. A method of conditioning hygroscopic granular material to prevent its coalescence due to heat, pressure or moisture which comprises uniformly coating such granular material with a small quantity of a dispersion of a material selected from the group consisting of colloidal attapulgite clay and colloidal sepiolite clay.

2. A method of conditioning hygroscopic granular material to prevent its coalescence due to heat, pressure or moisture which comprises spraying such granular material with a small quantity of an aqueous dispersion of a material selected from the group consisting of colloidal attapulgite clay and colloidal sepiolite clay.

3. A method of conditioning hygroscopic granular material to prevent its coalescence due to heat, pressure or moisture which comprises spraying such granular material with a small quantity of a deflocculated aqueous dispersion of colloidal attapulgite clay.

4. A method of conditioning a hygroscopic granular material to prevent its coalescence due to heat, pressure or moisture which comprises spraying such granular material with an aqueous dispersion of colloidal attapulgite clay which has been deflocculated to a sprayable consistency, utilizing said dispersion in amount such as to deposit from about 1 to about 15 pounds of said attapulgite clay, on a moisture free clay basis, per ton of said granular material.

5. A method of conditioning a hygroscopic granular material to prevent its coalescence due to heat, pressure or moisture which comprises spraying such granular material with an aqueous dispersion of colloidal attapulgite clay which has been deflocculated to a sprayable consistency, utilizing said dispersion in amount such as to deposit from about 2 to about 6 pounds of said attapulgite clay, on a moisture free clay basis, per ton of said granular material.

6. A method of conditioning nitrate fertilizer prills to prevent their coalescence due to heat, pressure or moisture which comprises spraying said prills with a small quantity of a deflocculated aqueous dispersion of colloidal attapulgite clay while maintaining said prills in agitated condition.

7. A method of conditioning hygroscopic fertilizer prills to prevent their coalescence due to heat, pressure or moisture which comprises uniformly spraying said prills with an aqueous dispersion of colloidal attapulgite clay, utilizing said dispersion in amount sufficient to deposit from about 1 to about 15 pounds of colloidal attapulgite clay, on a moisture free clay basis, per ton of said prills.

8. A cake resistant composition of matter comprising hygroscopic granules which normally tend to coalesce and clay uniformly coated on the surface of said granules in amount of from about 1 to about 15 pounds, on a moisture free clay basis, per ton of said granules, said clay having been coated on said granules by spraying said granules with a dispersion of a material selected from the group consisting of colloidal attapulgite clay and colloidal sepiolite clay.

References Cited in the file of this patent
UNITED STATES PATENTS

| | | |
|---|---|---|
| 1,228,361 | Hayden | May 29, 1917 |
| 2,016,892 | Clarvoe | Oct. 8, 1935 |
| 2,399,655 | Alton | May 7, 1946 |
| 2,399,987 | Cordie et al. | May 7, 1946 |
| 2,589,108 | Mark | Mar. 11, 1952 |
| 2,695,840 | Leppla | Nov. 30, 1954 |
| 2,875,120 | Trademan et al | Feb. 24, 1959 |
| 3,041,159 | Smith | June 26, 1962 |
| 3,062,637 | Marples et al. | Nov. 6, 1962 |